United States Patent [19]
Webb

[11] Patent Number: 5,291,847

[45] Date of Patent: Mar. 8, 1994

[54] AUTONOMOUS PROPULSION WITHIN A VOLUME OF FLUID

[76] Inventor: Douglas C. Webb, 769 Palmer Ave., Falmouth, Mass. 02540

[21] Appl. No.: 961,015

[22] Filed: Oct. 14, 1992

Related U.S. Application Data

[63] Continuation of Ser. No. 738,910, Aug. 1, 1991, abandoned.

[51] Int. Cl.$^5$ .............................................. B63G 8/14
[52] U.S. Cl. ................................ 114/331; 60/641.7; 440/1; 441/21
[58] Field of Search ................. 60/641.1, 641.6, 641.7, 60/495, 496, 527, 531; 185/44; 440/198, 900; 441/21; 114/124, 312, 330, 331; 73/170 R, 170 A; 92/84

[56] References Cited

U.S. PATENT DOCUMENTS

| | | | |
|---|---|---|---|
| 2,208,149 | 7/1940 | Vernet | 60/54.6 |
| 2,534,497 | 12/1950 | Albright | 137/157 |
| 2,714,759 | 8/1955 | Von Wangenheim | 29/33 |
| 2,806,376 | 9/1957 | Wood | 73/368.3 |
| 3,157,145 | 11/1964 | Farris | 440/44 |
| 3,753,311 | 8/1973 | Boone | 43/43.14 |
| 3,896,622 | 7/1975 | Daniello | 60/641 |
| 3,952,349 | 4/1976 | Erath et al. | 9/8 R |
| 4,031,581 | 6/1977 | Baugh | 9/8 R |
| 4,170,878 | 10/1979 | Jahnig | 60/641 |
| 4,183,316 | 1/1980 | Bennett | 114/331 |
| 4,233,813 | 11/1980 | Simmons | 60/496 |
| 4,266,500 | 5/1981 | Jurca | 114/333 |
| 4,364,325 | 12/1982 | Bowditch | 114/331 |
| 4,726,188 | 2/1988 | Woolfolk | 60/496 |
| 4,742,242 | 5/1988 | De Shon | 60/496 |

OTHER PUBLICATIONS

Stommel, "The Slocum Mission", *Oceanography*, Apr. 1989.
Exhibit B, Part A, "Volume and Surface Process Sensing Studies", 1989.
Exhibit C, Stommel et al., "B1 Platforms for the World Ocean Observing System", The Slocum Project, 1990.
Exhibit D, Stommel et al., "C.4.1 The Slocum Project", 1991.
Exhibits E, F, communication on behalf of inventor.
Exhibit G, Copies of overheads, Office of Naval Technology.

*Primary Examiner*—Matthew C. Graham

[57] ABSTRACT

Energy is collected from temperature differentials in a volume of fluid and the energy is used for autonomous propulsion in the fluid.

18 Claims, 10 Drawing Sheets

AUTONOMOUS PROPULSION WITHIN A VOLUME OF FLUID

This is a continuation of application Ser. No. 07/738,910, filed Aug. 1, 1991, now abandoned.

BACKGROUND OF THE INVENTION

This invention relates to autonomous propulsion within a volume of fluid.

Submarines and other autonomous underwater vehicles (AUVs), for example, have engines for propelling them within the ocean autonomously, that is without requiring a physical connection to the surface or ocean floor. Typically, to achieve autonomous propulsion, they include sources of stored energy such as batteries. Other, non-autonomous underwater vehicles obtain energy for propulsion from external sources, for example, electrical energy delivered by a cable connecting the device to an electrical source on the surface of the ocean.

SUMMARY OF THE INVENTION

In general, in one aspect, the invention features collecting energy from temperature differentials in a volume of fluid, and using the energy for autonomous propulsion within the fluid.

Preferred embodiments of the invention include the following features. The energy is collected from the temperature differentials by heat exchange with a temperature-responsive material. The material is one which undergoes expansion and contraction and a state change in response to temperature changes, e.g., a wax, a polyolefinic material, a halofluorocarbon, carbon dioxide, ammonia dissolved in water, or sulphur dioxide.

The energy derived by the temperature-responsive material is stored in a resilient energy storage medium (e.g., a compressed gas) via a piston. The energy derived from the temperature differentials is used to cause a change in buoyancy for purposes of propulsion. The change in buoyancy is achieved by expanding or contracting an expandable chamber (e.g., a bladder) by pumping a low-compressibility filling material (e.g., hydraulic oil). The pumping is done by the piston being driven by the gas.

The engine may perform other work in addition to propulsion. The engine may be glided horizontally as it is propelled vertically.

The engine takes advantage of an essentially inexhaustible supply of solar energy from thermal gradients in the ocean to permit missions of extended duration at low cost. It requires no connection to an external source of energy, nor does it need to carry a source of pre-stored energy, such as a battery, for propulsion.

Other features and advantages of the invention will become apparent from the following description and from the claims.

DESCRIPTION

We first briefly describe the drawings.

FIGS. 4, 5, 6, and 7 are cross-sectional views of a simplified model of the autonomous engine, in different stages of operation.

Figure 10:
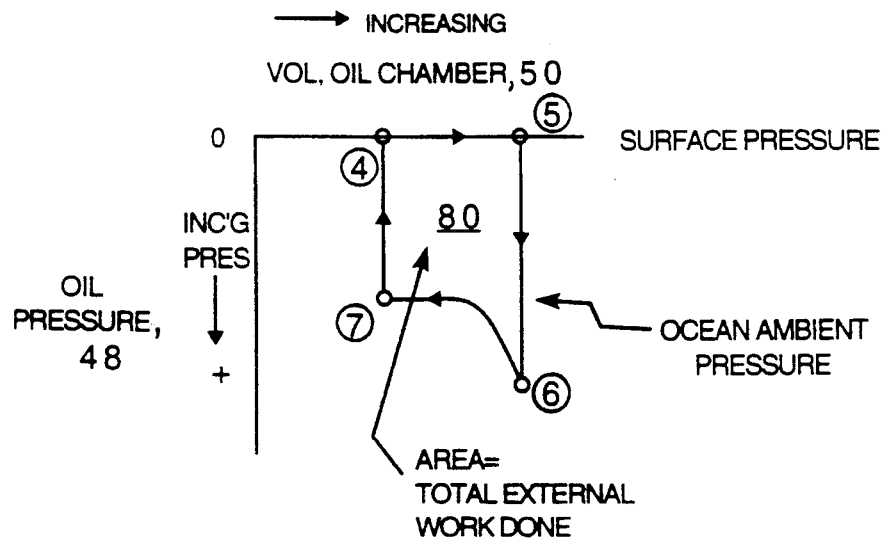
Figure 9:
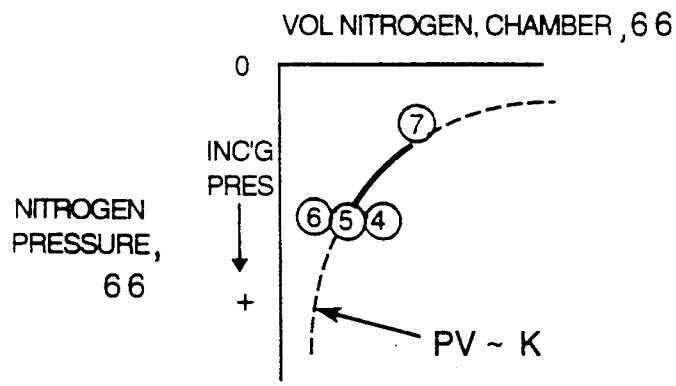
Figure 8:
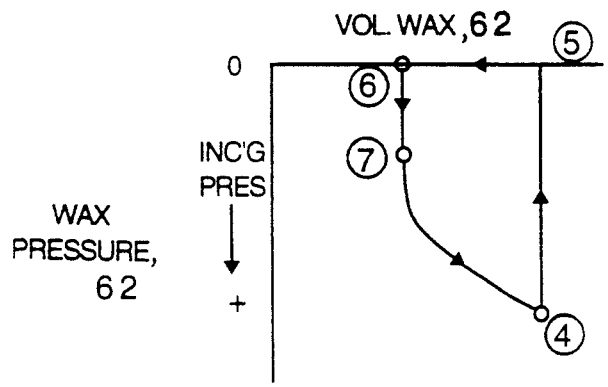

FIGS. 8, 9, and 10 are an indicator diagram of the pressure and volume in three chambers of the autonomous engine.

Figure 11:
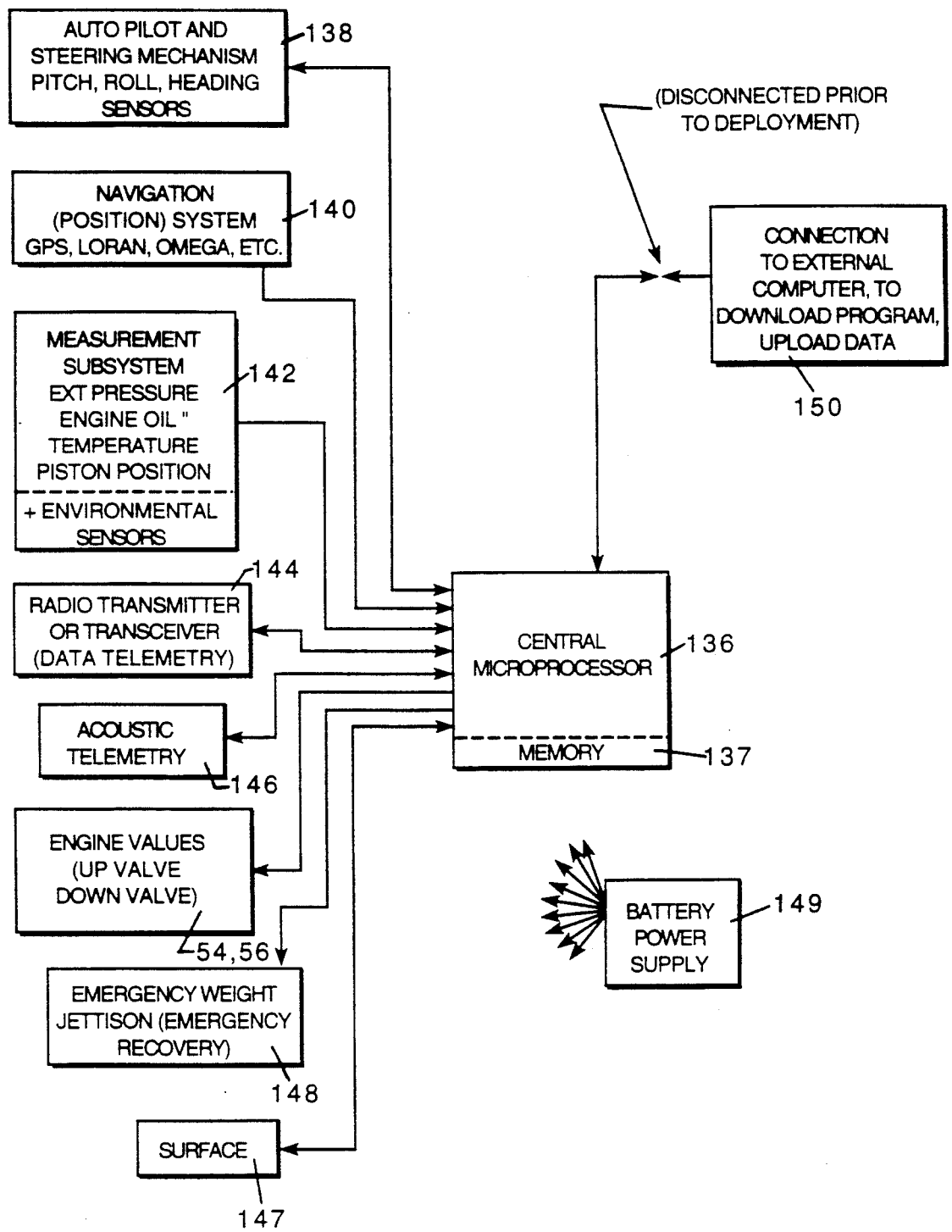

FIG. 11 is a functional block diagram of a control system for use with the autonomous engine.

Figure 12A:
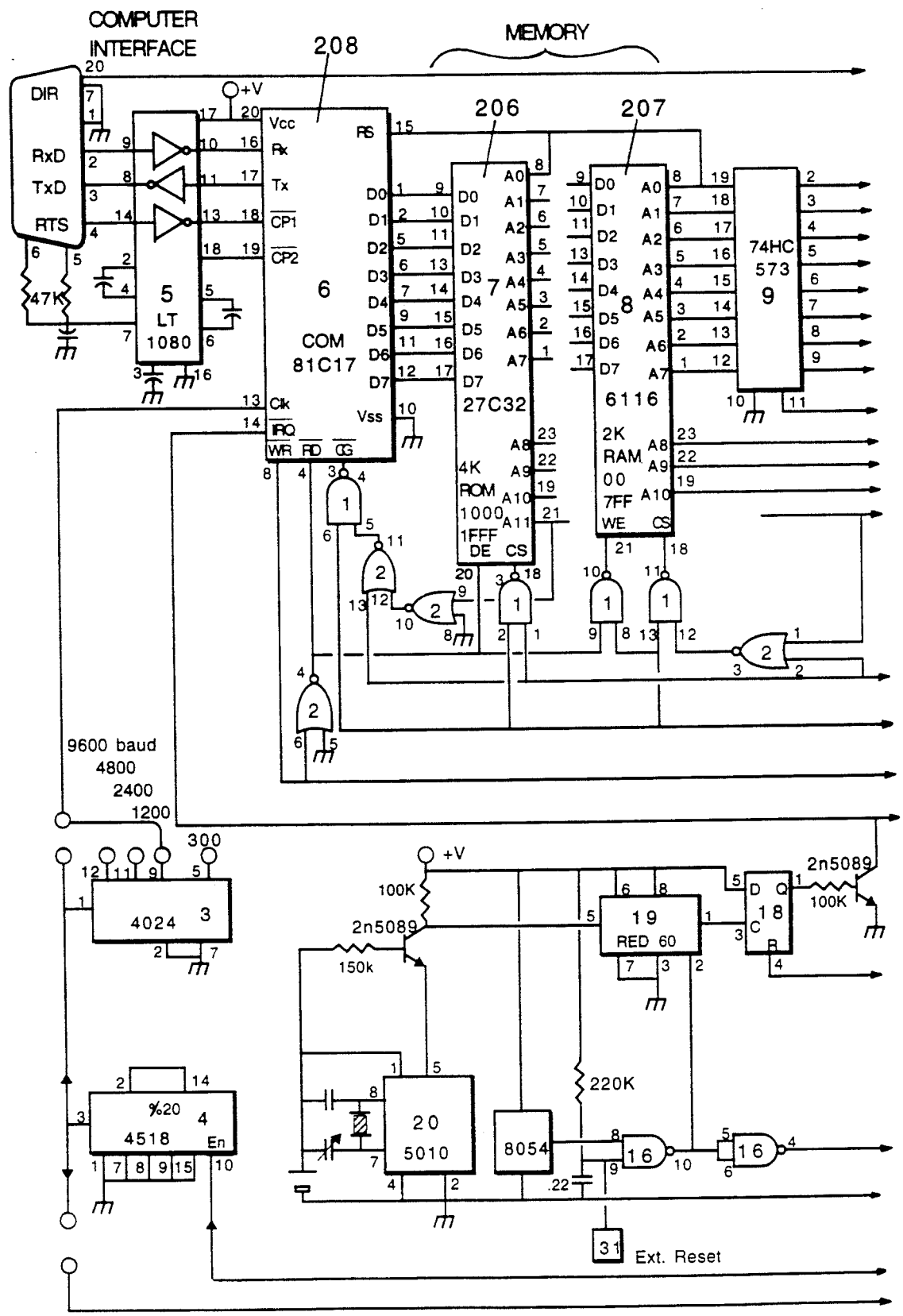
Figure 12B:
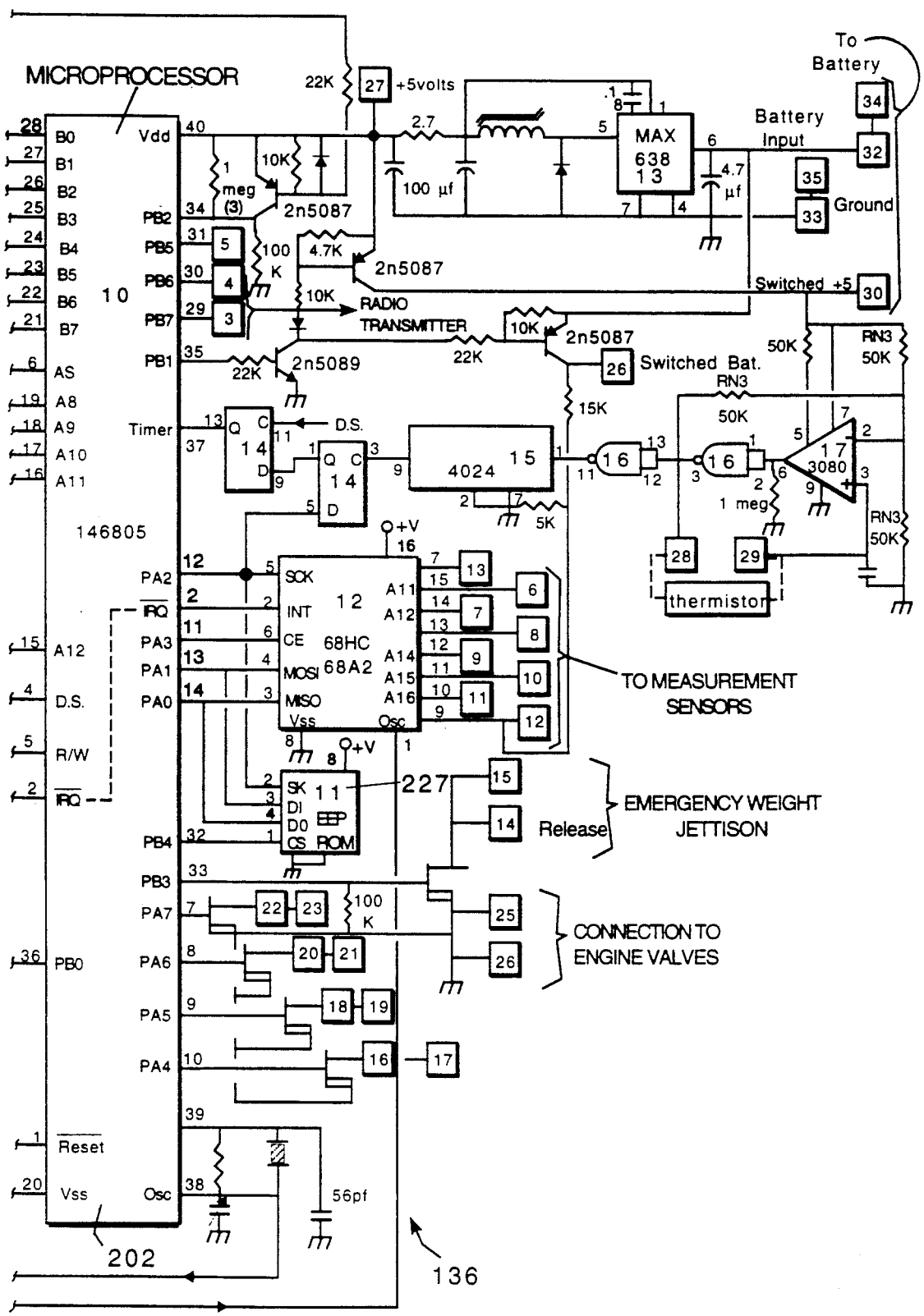

FIGS. 12A and 12B are schematic diagram of a microprocessor module.

Figure 13:
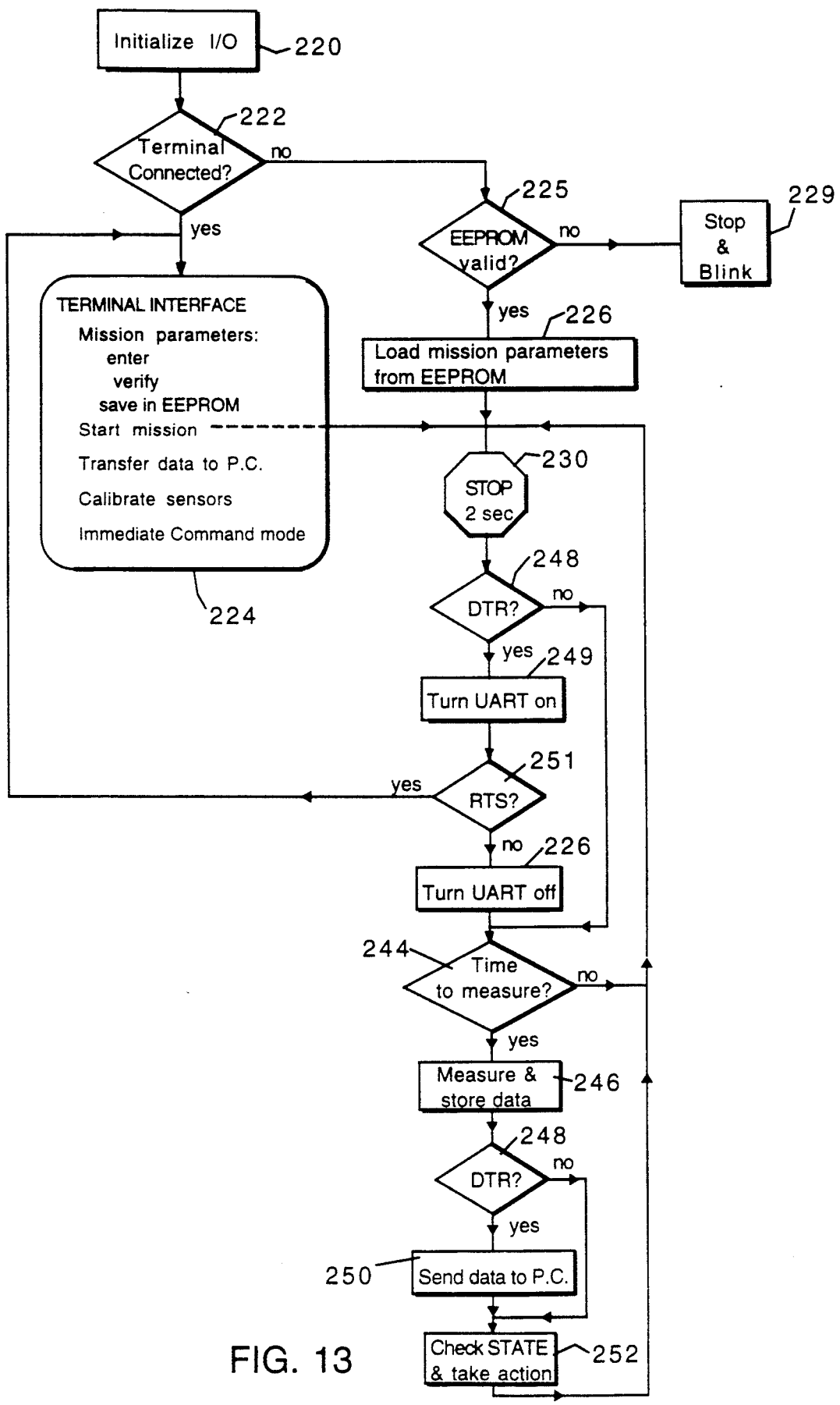

FIG. 13 is a flow diagram of a main control program.

Figure 14:
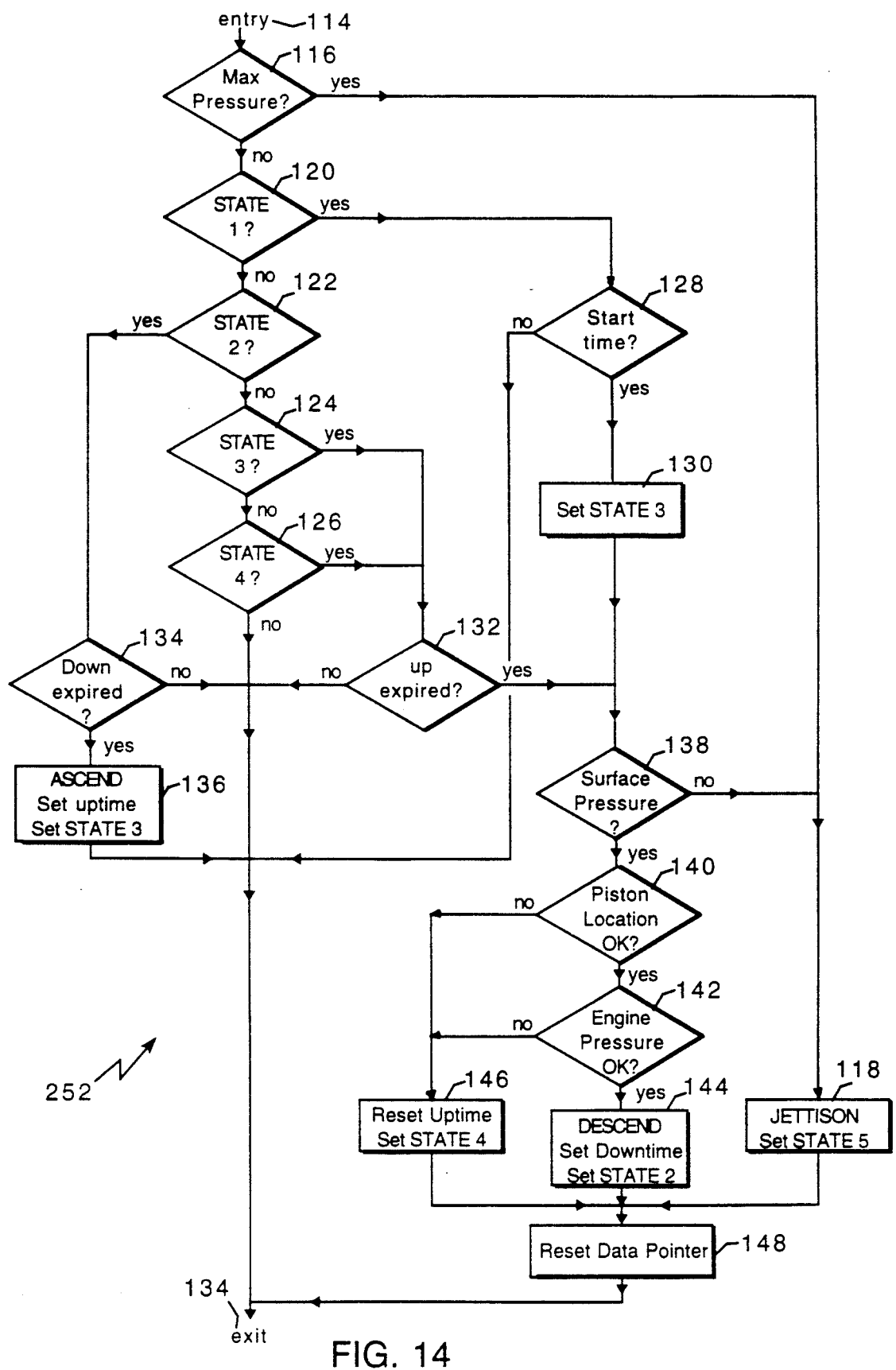

FIG. 14 is a flow diagram of a check state and take action process.

Figure 1:
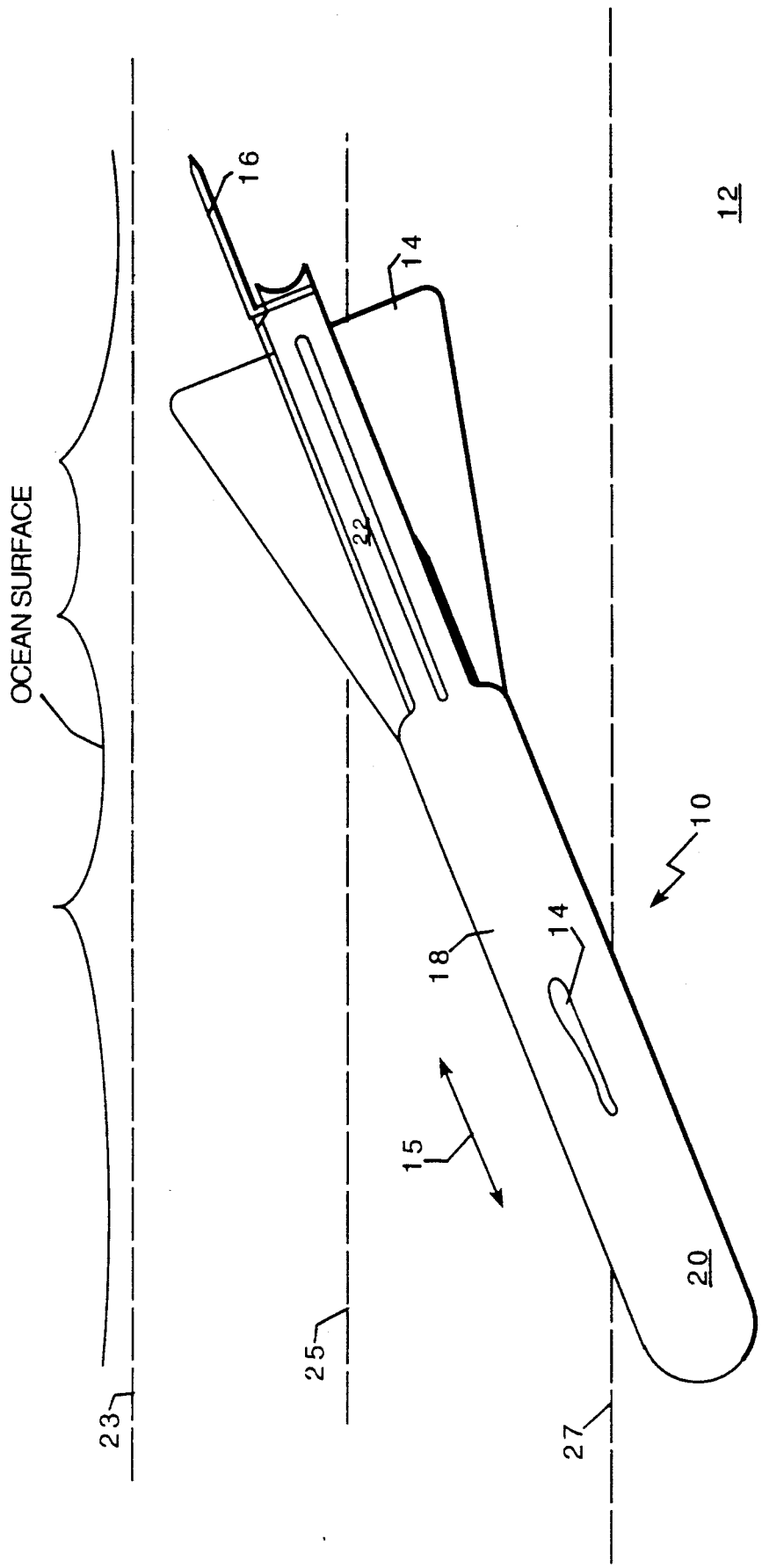
FIG. 1 is a side view of an AUV gliding downward at an angle within the ocean.

Referring to FIG. 1, an AUV 10 for use in an ocean or other volume of fluid has fins 14 for stability, an antenna 16 for communication, and a housing 18. AUV 10 carries a payload, in a forward section 20 of housing 18. The payload includes equipment that gathers environmental information and transmits it to receiving stations for processing and analysis. A fleet of AUVs 10 could monitor the oceans of the world and provide a constant stream of useful information much as a meteorological network of upper air stations currently observes and reports on the atmosphere; unlike the typical meteorological network, instructions could also be sent to the AUVs. Each AUV would operate in repetitive cycles. In each operating cycle the AUV would descend to a predetermined depth and ascend back to the surface, collecting data. The gathered data would then be communicated to a ship and/or land-based station. Each AUV could remain at a fixed longitude and latitude, or it could move to a new location from time to time. The movements could be based, for example, on a preprogrammed route, or on recognition of oceanic features.

An autonomous engine (not shown in FIG. 1) located in a rear section 22 of housing 18 propels the engine, causing it to ascend and descend vertically within the ocean. With a suitable control mechanism (e.g., a system for shifting the center of gravity, discussed below), AUV 10 may also glide (arrows 15, FIG. 1) at an angle during its ascent and descent (as shown in FIG. 12) thus permitting the AUV to change its horizontal location. AUV 10 could gather data during predetermined parts of its descent or its ascent, or both, or could sample data adaptively. Gathered data could be transmitted to the surface of ocean 12 via antenna 16.

Figure 2:
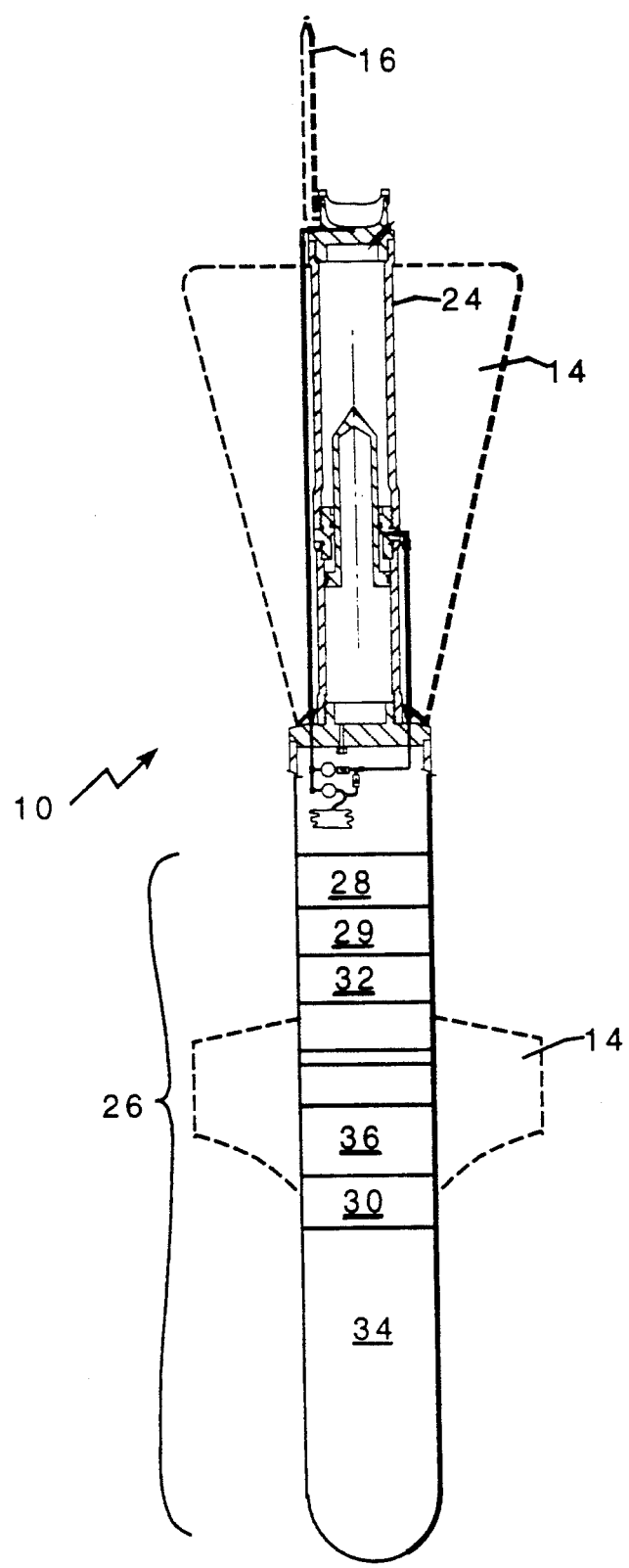
FIG. 2 is a diagrammatic view of the AUV.

Referring to FIG. 2, AUV 10 includes the autonomous engine 24 and equipment 26 including an acoustic link 28, a GPS receiver 29, a steering mechanism 32, ocean-measuring and data compression equipment 34, electronics 36 including an auto pilot, a controller, and a satellite transceiver, and a battery and auxiliary power supply 30.

Autonomous engine 24 is self-contained and can operate independently, even if removed from the AUV.

Figure 3:
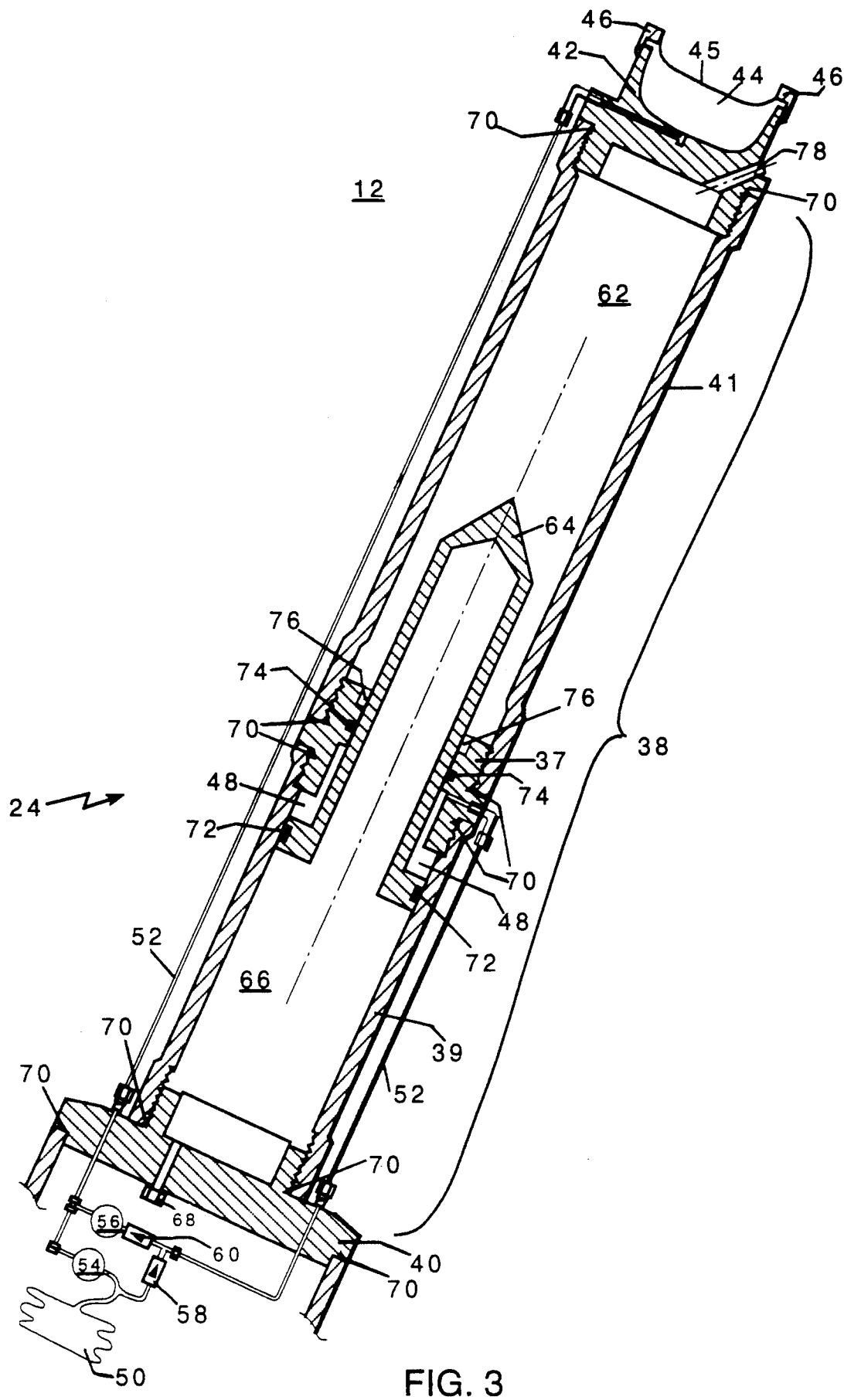
FIG. 3 is a cross-sectional view (partially schematic) of an AUV.

Referring to FIG. 3, autonomous engine 24 includes an aluminum cylinder 38 and a piston 64 which rides within the cylinder. Piston 64 separates the cylinder into a lower chamber 66 and an upper chamber 62. Lower chamber 66 contains a gas (nitrogen) under pressure for driving the piston toward the upper end of the cylinder (under certain conditions). Upper chamber 62 contains a temperature-sensitive phase-changing material (e.g., a wax) which expands and contracts in response to changes in the temperature of the ocean water. When the phase-changing material expands, it forces the piston against the gas in chamber 66, thus compressing (and storing energy in) the gas. When the energy stored in the gas is released by motion of the piston toward the upper end of the cylinder, work is performed by pumping hydraulic oil from a chamber 48 through piping 52 and valving into an external bladder 44. This increases the displacement or volume of the engine; because its weight does not change, the buoyancy of the engine increases, causing it to ascend. To descend, the oil in the external bladder is allowed to flow into an internal bladder 50, thus reducing the buoyancy of the engine.

Cylinder 38 is formed of a lower tubular piece 39 and an upper tubular piece 41 connected by a threaded aluminum union 37. At the lower end the cylinder 38 is mounted on the main pressure-resistant aluminum housing 40 of the AUV. The upper end of cylinder 38 is closed by an aluminum cap 42 which defines one wall of expandable external bladder 44. The other wall is defined by a flexible membrane 45. The pressure inside main housing 40, which has a 6.5 inch outside diameter and a wall thickness of 0.375 inch, is maintained slightly below atmospheric pressure.

Chamber 48 and bladders 44, 50 are interconnected by $\frac{1}{8}''$ o.d. stainless steel tubing 52 and valving. The valving includes two controllable valves 54, 56 (part number #VSRAM64840 available from Honeywell Skinner Valve Division, New Britain, Conn.) and two one-way check valves 58, 60. Tubing 52 is $\frac{1}{8}''$ o.d. stainless steel. The controllable valves are operated by a control system described below.

Two O-rings 70 seal the union 37 to the tubular pieces 39, 41. Two sliding seals 72, 74 (parts #TP028-4115 and #TP039-4115 available Irom parker Seal Group, O ring Division, Lexington, Ky.) prevent leakage between chambers 48, 62, and 66. The sliding seals slide on surfaces which are aluminum, hard anodized, and polytetrafluoroethylene impregnated and have a surface finish of 4 to 10 microinches. A scraper ring could be mounted in a groove near seal 74 to clean wax from the outer wall of piston 64 as it moves through its approximately 1.5 inch stroke.

All aluminum parts are alloy #6061-T6, providing resistance to corrosion and to hydrostatic pressure, and good thermal conductivity.

Figure 4:
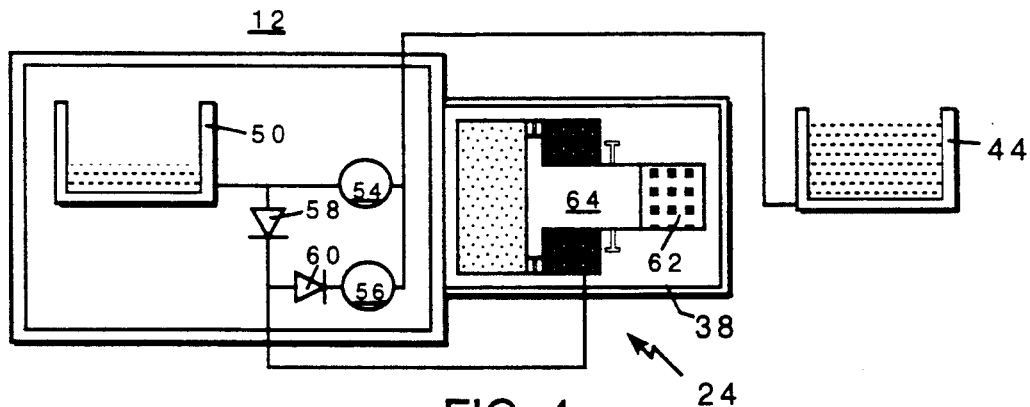

Referring to FIGS. 4, 5, 6, and 7, a complete operating cycle of engine 24 begins with engine 24 in a buoyant state at the surface (FIG. 4). To advance the engine cycle to the next state in which the engine descends in the ocean, valve 54 is opened. This allows the minimally compressible, relatively inert, stable, low viscosity fluid (e.g., a commercially available hydraulic oil) contained in external bladder 44 (at a pressure below atmospheric pressure) to pass into internal bladder 50. The flexible membrane 45 collapses as oil flows out. Conversely, flexible internal bladder 50 expands. The reduction in volume of the external bladder effectively decreases the buoyancy of the engine and it descends.

Figure 5:
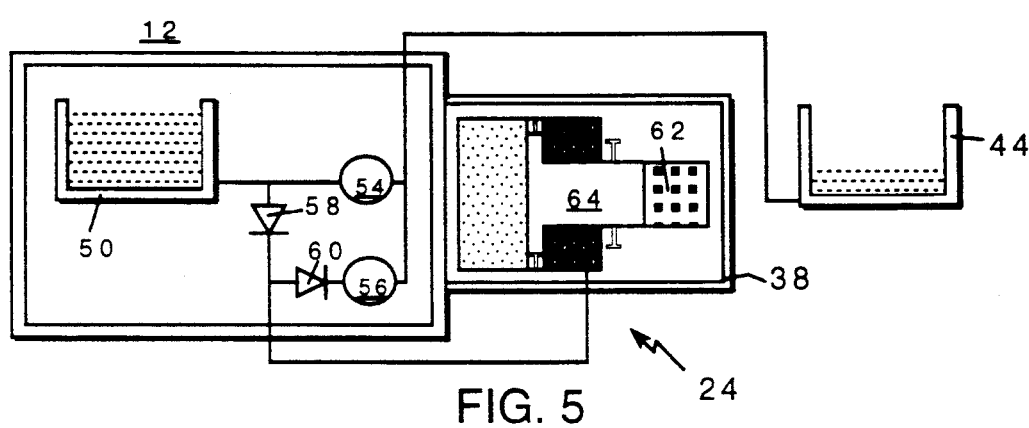
Figure 6:
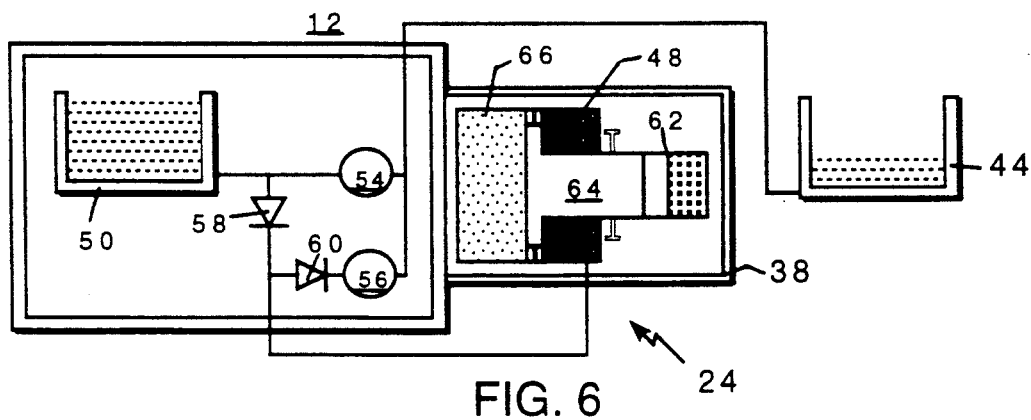

The depth to which the engine descends depends on the change in buoyancy, i.e., on the amount of oil transferred from external bladder 44 to internal bladder 50. After a suitable amount of oil has been transferred, valve 54 is closed. FIG. 5 shows the state of engine 24 after oil has been transferred and the engine is descending. Engine 24 will descend to and remain at the depth where the density of the engine equals the density of the surrounding water.

Referring again to FIG. 1, the ocean is typically characterized by regions 23, 25, 27 of decreasing temperature with depth. As engine 24 descends heat transfers from the wax (Caltherm #10011) in chamber 62 via the wall of cylinder 38 to the ocean water.

The wax is characterized by a change of state from solid to liquid at approximately 10° Celsius and a volume change of approximately 10% at the change of state. Thus, referring to FIG. 6, the wax changes state and contracts as engine 24 descends and reaches colder water temperatures.

Figure 7:
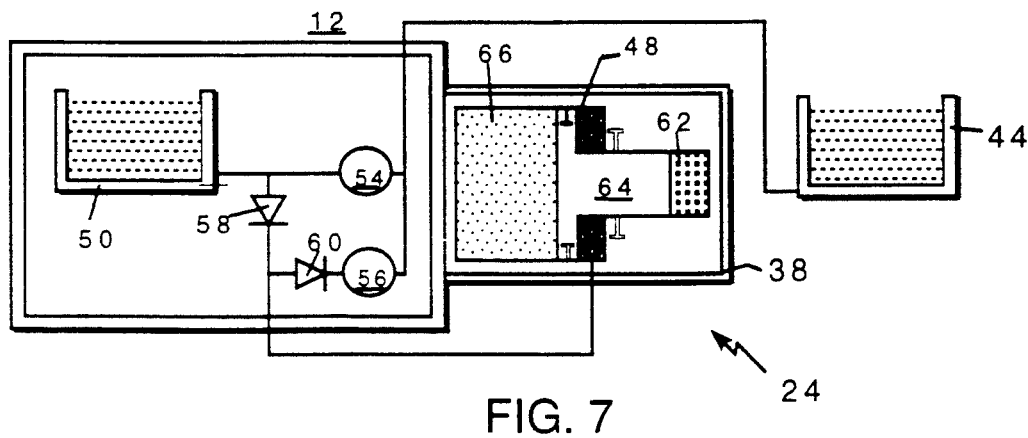

Generally, the engine must descend at least to a depth at which the wax changes state before it can begin to ascend. From such a depth, the engine can again be made to ascend by opening valve 56. This allows aluminum piston 64 (driven in a manner explained below) to force oil to flow from internal chamber 48, through valves 60 and 56, and into external bladder 44. Piston 64 overcomes the external, ambient hydrostatic pressure that is being exerted upon external bladder 44 and forces the oil to enter and expand external bladder 44 (FIG. 7). The increase in volume of external bladder 44 also increases the effective volume of engine 24 (i.e., decreases the density of engine 24) thus increasing its buoyancy and causing it to ascend.

The height to which engine 24 will ascend and remain depends on the amount of oil transferred from internal chamber 48 to external bladder 44. After a suitable amount of oil has been transferred, valve 56 is closed. The engine will ascend until the density of the engine equals the density of the surrounding ocean water. Generally the AUV should not descend again until it has risen at least to a level at which the wax has undergone its state change; otherwise there will be no stored energy to permit it to ascend again.

The source of the force which drives piston 64 is pressure exerted by a compressed resilient material (e.g., nitrogen gas) contained in chamber 66. The nitrogen in chamber 66 acts as a "gas spring" to store potential energy when compressed by piston 64. The stored energy is controllably released (by operation of valve 56) to perform useful work.

Chamber 66 is initially "charged" with nitrogen gas (through charge valve 68, available as Unitest from Schroeder Brothers Corporation of McKees Rocks, Pa.) to approximately 2000 pounds per square inch. The oil pressure will vary during the operating cycle of engine 24 with both the position of piston 64 and the temperature of ocean 12.

Referring again to FIG. 6, prior to opening valve 56, piston 64 is prevented from moving by the oil in internal chamber 48, even though (1) the wax in chamber 62 has contracted to allow space for movement, and (2) the nitrogen gas in chamber 66 is exerting force upon piston 64.

Referring again to FIG. 4, as the engine ascends through warmer water, the wax expands, forcing piston 64 to move and compress the nitrogen in chamber 66. Movement of piston 64 also draws oil from internal bladder 50, through valve 58, into chamber 48.

One complete operating cycle is finished when engine 24 reaches the surface of ocean 12 and is again in the buoyant state.

Referring to FIGS. 8, 9, and 10, the circled numbers 4 through 7 correspond to the four states illustrated in FIGS. 4, 5, 6, and 7, respectively. The total external work done is represented by area 80 in FIG. 10.

Referring to FIG. 11, operation of the AUV is controlled by a central microprocessor 136 based on a program stored in memory 137. The microprocessor sends commands to and receives information from an auto pilot and steering mechanism 138, a radio transmitter or transceiver (Telonics ST5) 144, an acoustic telemetry subsystem 146, and a surface engine 147 (used for additional buoyancy at the surface). The microprocessor also sends commands to valves 54, 56 and to an emergency weight jettison subsystem 148, and receives information from a measurement subsystem 142 and a navigation subsystem 140. A battery 149 supplies power.

Referring to FIG. 12, the central microprocessor module 136 includes a 146805E2P microprocessor 202 (available from Motorola of Phoenix, Ariz.), a 2K RAM chip (available from Toshiba) 204, a 4K ROM chip (available from National Semiconductor, Santa Clara, Calif.) 206, and a 81C17 communication chip 208 (available from Standard Micro Systems Corp, Hauppauge, N.Y.).

Prior to and following deployment of the engine, module 136 is connected to an external computer 150 (FIG. 11) to allow programs and data to be transferred between the external computer and the microprocessor memory. The control program, written in the assembly language of the 146805 microprocessor, and the downloaded data provide module 136 with all necessary information and operator-defined parameters needed for proper operation during deployment. The uploaded data includes information about the ocean gathered by the AUV. The computer is disconnected for deployment of the engine.

Prior to deployment, the operator can set the start time, the descent time, the ascent time, the maximum permissible hydrostatic pressure, and the measurement interval. During deployment, the measured data includes the state, the ambient pressure, the engine pressure, and the temperature. Calibration multipliers can be set for each measured variable.

Referring to FIG. 13, the main flow of the control program begins with initialization of I/O (step 220). A check is made whether the computer terminal is connected (step 222). If so, various actions can be taken as part of a terminal interface process (step 224) including dumping data, setting parameters, and starting the mission. If not, a check is made to see if the EEPROM 227 (FIG. 12) is valid (step 225). If not, the process is stopped and the display is blinked (step 229). If so, the mission parameters are loaded from the EEPROM (step 226) and the process begins with a 2 second stop (step 230). Next, a data terminal ready (DTR) check is made (step 248). If yes, the UART is turned on (step 249) and a ready-to-send (RTS) check is made (step 251). If yes, the process loops back to the terminal interface process. If not, the UART is turned off. When the UART has been turned off, or if the data terminal ready check failed, a check is made to see whether it is time to take measurements (step 244). If so, data is measured and stored (step 246) and a second DTR check is made (step 248). If yes, then data is sent to the computer (step 250). If not (or when data has been sent to the computer), the state is checked and motion is performed accordingly (step 252). Once step 252 is done, or if it is not time to make a measurement (step 244), the program returns to step 230.

Referring to FIG. 14, in step 252 (FIG. 13), the state is checked and corresponding action is taken with respect to the propulsion of the AUV.

There are four control states (control states 1 through 4, which do not have a direct one-to-one correspondence with the operating states labelled on FIGS. 4 through 10) and two special control states (control states 0 and 5). In control state 1, the engine is inactive and the intended action is for the engine to wait for the occurrence of an initial start time. In control state 2, the intended action is for the engine to descend. In control state 3, the intended action is for the engine to ascend. In control state 4, the intended action is for the engine to wait for the piston position and the gas pressure to come within an acceptable range (acceptable operating envelope) before descending. Control state 0 is the idle control state. In control state 5 the intended action is to jettison a weight in order to facilitate recovery and avoid damage to the engine. This feature would be used only in an emergency (i.e., malfunction) and would likely be eliminated after prototype testing.

At the beginning 114 of each iteration of the check control state and take action process, the hydrostatic pressure of the ocean is checked to see if it exceeds the permissible maximum which has been entered by the operator (step 116). If so, a weight is jettisoned to force the AUV to the surface, and the control state is set to control state 5 (step 118). If not, a determination is made whether the control system is in control state 1, 2, 3, or 4 (steps 120, 122, 124, and 126). If the control system is in control state 3 or 4 and the ascend timer has not expired (step 132), or if the control system is in control state 2 and the descend timer has not expired (step 134) the process is exited 134 (the control system remains in its current control state).

If the descend timer has expired the valves are set for ascending, the control state is reset to control state 3 (ascend), and the ascend timer is set (step 136); then the process is exited.

If the control system is in control state 1 (step 120) a check is made to see if the start timer has elapsed (step 128); the start timer indicates whether the time for another ascend/descend/measurement cycle has been reached; if not the control state is not changed and the process is exited. If so, the process is reset to control state 3 (step 130).

If the control system is in control state 3 and the ascend timer has expired, or if the control system has been switched from control state 1 to control state 3, a check is made to see if the AUV is at the surface (step 138). If not then the control state is reset to 5 and the weight is jettisoned (step 118) to force the AUV to the surface. On the other hand, if the AUV is at the surface, then checks are made for proper piston location (i.e., the location illustrated in FIG. 4, and corresponding to point 4 in FIGS. 8, 9, and 10—at this position the piston has been "cocked" with stored energy usable for enabling the AUV to ascend) (step 140) and proper engine pressure (i.e., the pressure of the nitrogen gas in chamber 66, which provides redundant information to the piston position information) (step 142). If both are proper (indicating that the AUV is ready to descend) then the valves are set for descending and the control system control state is reset to control state 2 (step 144). If the piston location or the engine pressure is improper, the control system is reset to control state 4 and the ascend timer is reset (step 146).

Finally the data pointer is reset (step 148) and the process is exited.

When reset, the ascend timer contains a value (specified by an operator before deployment) which represents the approximate time for the engine to descend from the surface of the ocean to the lowest depth in its depth range. When reset, the down timer contains a value (specified by the operator before deployment) which represents the approximate time for the engine to ascend from the lowest depth in its depth range to the surface of the ocean.

Controlled shifting of the center of gravity of the AUV could be used to steer it horizontally as a "glider". Displacing an internal weight along x and y axes would cause the AUV to pitch and roll. The weight could be the batteries but other masses could be used. Movement of the fluids within the engine also changes the center of gravity and may be used to advantage. By using asymmetric tail fins (2 big, 2 small), the roll angle can be used to induce asymmetric hydrodynamic forces on the fins, causing the vehicle to yaw (i.e., turn a corner).

Other embodiments are within the following claims.

In the embodiment described above, the valves 54 and 56 are battery operated solenoid valves, and the control system is battery operated. Because engine 24 derives energy directly from its environment, it could operate without any connection to external sources of energy and, in theory, could function in the surrounding environment for a lifetime (e.g., years) limited only by the natural wear on and degradation of its parts. However, valves 54 and 56 would need to be mechanically actuated by, for example, pressure from ocean 12, pressure from within engine 24, and/or temperature.

Engine 24 is insensitive to the rate of change of temperature per unit vertical depth and therefore the detailed character of the fluid temperature gradient is not of concern. However, the maximum span of temperature is important, and must be sufficient to cause the wax in chamber 62 to undergo a relatively large volumetric expansion/contraction when engine 24 moves through its vertical range. The maximum temperature differential between the upper and lower extremes of the vertical traverse of engine 24 determines what material should be loaded into chamber 62 through fill hole 78. The material could be any of a polyolefinic material, a halofluorocarbon (i.e., a "freon"), carbon dioxide ($CO_2$), or sulphur dioxide ($SO_2$). Other materials which undergo liquid-solid or liquid-gas state changes could be used, as could materials (e.g., ammonia gas dissolved in water) which go into and out of solution (i.e., whose vapor pressure varies) with changes in temperature.

A sufficient vertical temperature differential (such as is found in the temperate and tropical oceans) is needed for engine 24 to operate properly. A suitable gradient may also be present (or created by artificial means) in other natural or man-made fluid bodies such as lakes, rivers, and tanks.

The work done by the engine could be used for non-propulsion purposes such as operating actuators, sensors, ocean-monitoring equipment, communication equipment, and generators, or to alter the center of gravity or its balance to steer the AUV. A different number and arrangement of valves may be used. For example, a three-way valve could be used in place of valves 54, 56. Other sealing devices such as rolling diaphragm seals and compliant metal bellows seals could be used in place of sliding seals 72 and 74. The external expandable bladder could be relocated to the base of the engine for purposes of streamlining. Other materials such as steel alloys, titanium alloys, ceramic, or glass could be used in place of aluminum in the engine.

What is claimed is:

1. An autonomous engine for use in a volume of fluid, said engine comprising
    an energy collector for collecting energy from temperature differentials in the volume of fluid, said energy collector comprising a medium for storing the collected energy and a movable partition for transferring said energy from a temperature-responsive material, adapted to collect said energy, to said medium,
    a buoyancy shifter for using the collected energy to cause a shift in the buoyancy of the engine and to self-propel the engine autonomously to successive depths within the volume of fluid, and
    a valving mechanism for selectively controlling when said buoyancy shifter uses the collected energy to self-propel the engine to successive depths.

2. The engine of claim 1 wherein said energy collector comprises
    a temperature-responsive material for exchanging heat with the volume of fluid.

3. The engine of claim 2 wherein the temperature-responsive material is one which undergoes expansion or contraction in response to temperature changes.

4. The engine of claim 2 wherein the temperature-responsive material is one which undergoes a state change in response to temperature changes.

5. The engine o claim 2 wherein said temperature-responsive material comprises one of the following: a wax, a polyolefinic material, a halofluorocarbon, carbon dioxide, ammonia dissolved in water, or sulphur dioxide.

6. The engine of claim 1 wherein said energy collector further comprises a medium for storing the collected energy.

7. The engine of claim 1 wherein said medium comprises a compressed gas.

8. The engine of claim 1 wherein said buoyancy shifter comprises an expandable chamber, and a filling material for expanding and contracting the chamber.

9. The engine of claim 8 wherein said filling material comprises a low-compressibility material.

10. The engine of claim 9 wherein said buoyancy shifter comprises a movable partition for pumping the filling material into the chamber.

11. The engine of claim 8 wherein said expandable chamber comprises a bladder.

12. The engine of claim 1 wherein said buoyancy shifter is arranged to perform other work in addition to propulsion.

13. An autonomous engine for use in a volume of fluid, said engine comprising
    a temperature-responsive material which undergoes a state change for collecting energy from the volume of fluid,
    a movable partition,
    a gas medium for storing the collected energy from the thermally-responsive material via the movable partition,
    a filling material for expanding or contracting the chamber under the influence of the movable partition, and
    a valving mechanism for selectively controlling the expanding and contracting of the chamber by said filling material.

14. The autonomous engine of claim 13 wherein said mechanism comprises valving for controlling flow of said filling material.

15. The apparatus of claim 1, 10, or 13 wherein said movable partition comprises a piston.

16. A method for autonomously self-propelling an engine in volume of fluid, comprising collecting, in a temperature-responsive material, energy from temperature differentials in the volume of fluid, using a movable partition to transfer the energy collected in the temperature-responsive material to a storage medium, using the collected energy to shift the buoyancy of the engine and self-propel the engine autonomously to successive depths within the volume of fluid, and using valving to selectively control when the collected energy is used to shift the buoyancy to propel the engine.

17. The method of claim 16 wherein said step of using the energy to propel the engine includes propelling the engine vertically to various depths, and said method further comprises causing said engine to glide horizontally as it is being propelled vertically.

18. The method of claim 16 wherein said movable partition comprises a piston.

* * * * *